Nov. 29, 1966 C. E. BOHNENBLUST 3,288,943
APPARATUS TO VISUALLY IDENTIFY CONDUCTOR PAIRS IN A MULTIPAIR CABLE
Filed Oct. 10, 1963
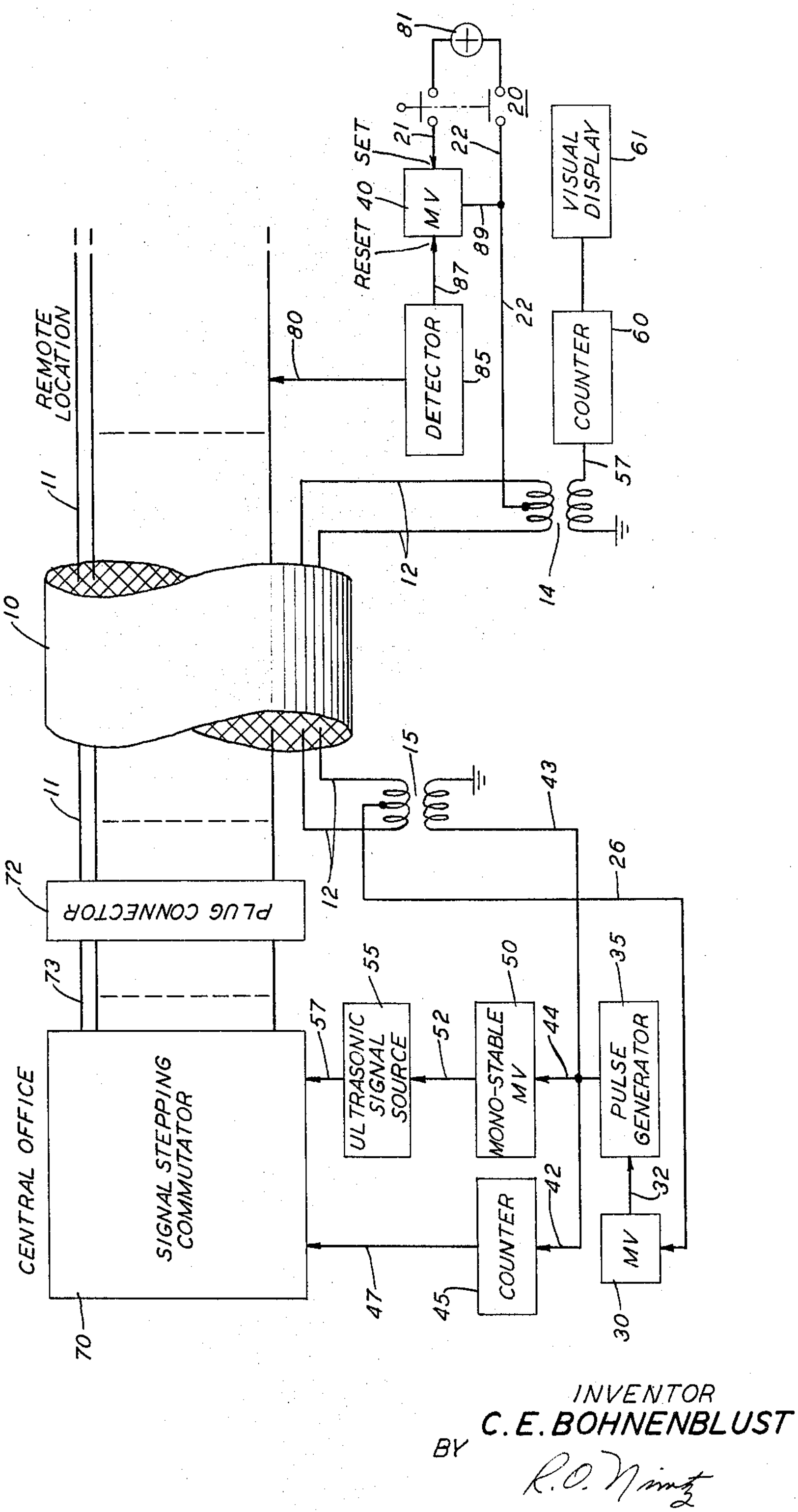
INVENTOR
C. E. BOHNENBLUST
BY R. O. Nimtz
ATTORNEY United States Patent Office 3,288,943

Patented Nov. 29, 1966

3,288,943

APPARATUS TO VISUALLY IDENTIFY CONDUCTOR PAIRS IN A MULTIPAIR CABLE

Clarence E. Bohnenblust, Saratoga, Calif., assignor to American Telephone and Telegraph Company, New York, N.Y., a corporation of New York Filed Oct. 10, 1963, Ser. No. 315,128
9 Claims. (Cl. 179—175.3)

This invention relates to the identification of conductors in a multiconductor cable and, more particularly, to the automatic identification of conductor pairs in a telephone exchange cable.

A telephone cable used to connect subscribers from some remote location to a central office is generally made up of a large number of insulated pairs of conductors which are twisted together. These conductors are all contained within a single protective sheath. Each of the conductor pairs connects a particular subscriber to a terminal on a main frame at the central office. Each conductor pair at the end of a cable in the field must therefore be identified in terms of its corresponding connection to the main frame at the central office.

Identification of the conductor pairs is, at present, conducted manually. Two workmen are stationed, respectively, at the central office and the field end of the cable. The man in the central office applies an audible signal to each of the conductor pairs. He communicates the identity of each energized pair to the man in the field at the time the signal is applied. The man in the field has an electrical probe connected to an audio detector. As the man in the field is informed as to the identity of an energized pair, he manually scans the conductor pairs of the cable to find the energized pair. He puts an identification marker on that pair and notifies the man at the central office of the identification. This procedure is continued until all of the conductor pairs have been identified. Apparatus to perform this type of identification is disclosed in Fisher-Parker Patent 2,133,384, issued October 18, 1938.

There also presently exists an identification system that permits a single operator to identify the conductor pairs. Such a system usually comprises some dial pulse controlled electromechanical selecting means to allow the operator at the field location of the multiconductor cable to selectively apply a signal tone at the central office to any conductor pair in the cable. The operator then manually scans all of the conductor pairs at the field end of the cable until he locates the one that is energized. Such identification systems are disclosed in Lowman Patent 2,799,739, issued July 16, 1957, and Meanley Patent 2,806,995, issued September 17, 1957.

Another identification system permitting a single operator to identify conductor pairs utilizes an audible signal, applied by the operator at the field location to a conductor pair selected at random, to operate electromechanical switching means at the central office termination of the cable. This central office electromechanical switching means indicates a number corresponding to the identity of the conductor pair. Electromechanical switching means at the field location, which are controlled by the central office switching apparatus, indicate the same identifying number to the operator. Such an identification system is disclosed in the patent application of J. F. L. Palmer, Serial No. 160,785, filed December 20, 1961, and assigned to applicant's assignee.

In the above-described prior identification systems, the methods used to identify conductor pairs are either too slow and cumbersome or else require the operator to perform a large number of duties in the operation of fairly complicated equipment with a high probability of error. The present invention identifies individual conductor pairs automatically with a minimum of skill and effort required on the part of the operator.

It is an object of the present invention to reduce the time consumed and improve the efficiency of conductor pair identification.

It is another object of the invention to automatically identify any conductor pair of a cable at its field location termination.

It is yet another object to identify conductor pairs with the use of only a single operator to control the apparatus.

It is still another object of the invention to identify conductor pairs with a high degree of precision and accuracy.

It is a further object to identify individual conductor pairs by automatically and visually presenting a numerical display of the identification of a particular selected conductor pair.

In accordance with the present invention, a pulse generator at the central office location drives a cyclic counting mechanism. The cyclic pulse output from this mechanism enables a stepping switch to sequentially apply an alternating current signal to successive individual conductor pairs of a multiconductor cable.

A cyclic counting mechanism at the field location of the multiconductor cable is synchronized with the cyclic counting mechanism at the central office. An electrical probe coupled to one of the unknown conductor pairs at the field location detects the arrival time of the signal on that particular conductor pair. This signal is used to disable the pulse generator and thus de-energize both cyclic counting mechanisms. The count at which the cyclic counting mechanisms are stopped is, of course, the identification count assigned to that particular conductor pair at the central office. A visual display apparatus displays the count to the operator at the field location.

These and other objects, the nature of the present invention and its various advantages, will appear more fully upon consideration of the attached drawing and of the followinug detailed description of the drawing wherein:

The sole figure is a general block diagram of a conductor pair identifying apparatus according to the present invention.

Referring more particularly to the drawing, a schematic block diagram of one particular embodiment of the invention is disclosed to more particularly illustrate the mode of operation of the invention.

A multiconductor cable 10, comprising a plurality of conductor pairs 11, is illustrated as joining the central office to some remote location in the field. The cable, in addition to the unidentified conductor pairs, has an easily identifiable spare conductor pair 12, which is used as a control wire connection from identifying equipment in the field to equipment at the central office. For illustrative purposes, it is assumed that the multiconductor cable 10 contains one hundred conductor pairs plus the additional spare conductor pair 12. It is to be understood that the invention would work equally well should the cable contain a different number of conductor pairs.

The spare conductor pair 12 is inductively coupled to the identifying apparatus at both the field and central office location by means of the center tapped transformers 14 and 15, respectively, thus providing a simplex direct current signaling circuit as well as an alternating current path.

The operation of the invention is initiated by a single operator at the field location who momentarily closes a circuit energizing switch 20. The circuit energizing switch 20 may comprise a nonlocking, normally open single throw double pole switch. This switch, when closed, completes a circuit from a unidirectional potential source 81 to produce a momentary pulse signal output on two separate output leads, 21 and 22.

The momentary closing of the switch 20 applies a pulse signal output on lead 22, which is connected to the center tapped winding of transformer 14. The pulse signal is transmitted on the spare conductor pair 12 to the center tapped winding of transformer 15. From thence the pulse signal is transmitted, via lead 26, to the input of a bistable multivibrator 30. This pulse signal switches the bistable multivibrator 30 into a state which applies a continuous signal, via lead 32, to enable the pulse generator 35.

The momentary closing of the circuit energizing switch 20 also applies a pulse signal on lead 21 simultaneously with the pulse output on lead 22. The pulse signal on lead 21 is applied to the set input of a bistable multivibrator 40. This multivibrator, when so energized, is placed in one stable state and remains in that state until reset to its other state.

The pulse generator 35 at the central office location applies a pulse train output of a predetermined repetition rate on three separate output leads. One output is applied, via lead 42, to a counter 45. The counter 45 may comprise a ring counter, a shifting register, or some other known suitable pulse distributing network.

The second pulse output of the pulse generator 35 is applied, via lead 44, to a monostable multivibrator 50. Each pulse applied, via lead 44, to the multivibrator 50 switches it to its unstable state where it remains for some brief period. The output of multivibrator 50 is applied, via lead 52, to an ultrasonic signal source 55 to enable source 55 for the duration of its output. The signal source 55 may comprise a free running oscillator on any device known in the art capable of generating an ultrasonic frequency signal.

The third pulse output of pulse generator 35 is applied, via lead 43, to the primary winding of transformer 15. This transformer differentiates the pulse and transmits it, via the spare conductor pair 12, to transformer 14 at the field location. This pulse, again differentiated, is applied, via lead 57, to a counter 60, which may be similar to the counter 45 at the central office. Inasmuch as the same pulse output is used to step the cyclic counters at both the central office and field location, they advance in synchronism.

Connected to the cyclic counter 60 is a visual display apparatus 61 to give a visual indication of the count at any particular time. The visual display apparatus 61 may comprise a plurality of lamps, with illuminable numbers individually energized by the output of the counter 60. A suitable alternative embodiment may comprise a visual indicator system utilizing "Nixie tubes" such as those disclosed in Mathamel Patent 2,962,698, issued November 29, 1960.

The output of the counter 45 is applied, via lead 47, to a signal commutator 70. Such a commutator may comprise a plurality of discretely operable switching devices to which there is simultaneously applied a signal from source 55. Other types of signal commutation switches well known in the art may be substituted without departing from the spirit and scope of the invention. The signal commutator 70 is controlled by the pulse output of counter 45. The signal commutator sequentially steps the ultrasonic signal applied to it, via lead 57, to the output conductors 73.

The stepped output of the signal commutator 70 is applied, via a plug connector 72, attached to a main distributing frame, not shown. The distributing frame is the terminus for the conductor pairs 11.

The operator at the field location couples the probe 80 to a conductor pair selected at random. The probe 80 is preferably a capacitive probe which allows it to detect a signal on one of the conductor pairs 11 without removing the insulation of that pair. A suitable probe mechanism for the purposes of the present invention is disclosed in R. M. Scarlett, Patent No. 3,181,062, issued April 27, 1965, and assigned to applicant's assignee.

When the ultrasonic signal is stepped by commutator 70 to the conductor pair to which probe 80 is coupled, that signal is sensed by the probe 80 and is applied to a signal detector 85 which converts the ultrasonic signal into a direct-current signal. The direct-current signal from detector 85 is applied, via lead 87, to the reset input of the bistable multivibrator 40. The reset signal switches the multivibrator 40 into its other stable state. The multivibrator 40, so switched, applies a voltage pulse, via leads 89 and 22, to the center tapped winding of transformer 14. It is then transmitted, via the spare conductor pair 12, transformer 15 and lead 26, to the input of multivibrator 30 at the central office, causing it to switch to the other stable state. By switching to the other state, multivibrator 30 removes the enabling voltage applied to the pulse generator 35, via lead 32, and the pulse generator 35 ceases to operate.

With the pulse generator 35 no longer supplying the driving pulses, both counters 45 and 60 cease to advance. The count at which the counter 60 stops, and which is displayed visually on the visual display apparatus 61 at the field location, is the identification number assigned to the conductor pair 11 which is coupled to the probe. Removal of the probe and reoperation of the circuit energizing switch 20 enables the counter to resume counting and allows the operator to scan other pairs with the probe 80 to identify them.

While the conductor pair identification system of the present invention has been described in connection with identifying conductors in a telephone system, it is to be understood that this embodiment is simply illustrative of the many possible arrangements which can represent applications of the principles of the invention. The other applications can readily be devised by those skilled in the art without departing from the spirit and scope of the invention.

What is claimed is:

1. In combination, a multiconductor cable, means at one end of said cable to sequentially apply signals to individual conductors of said cable, counting means at the other end of said cable to count in synchronism with said sequential signal application means at said one end of said cable, visual display means to indicate the progress of said counting means, probing means at said other end of said cable, and inhibiting means to stop said sequential application means in response to a signal detected by said probing means.

2. The conductor identifying apparatus in claim 1 wherein said sequential application means includes a pulse generator, an ultrasonic signal source, pulse distributing means responsive to the output of said pulse generator, and signal commutation means to connect said ultrasonic signals to said conductors in sequence in response to said pulse distributing means.

3. The conductor identifying apparatus in claim 1 wherein said probing means includes means to detect an ultrasonic signal, and means to convert said ultrasonic signal to a unidirectional signal.

4. The conductor identifying apparatus in claim 2 further including a spare conductor pair connecting said pulse generator and said counting means.

5. Apparatus to identify individual conductors in a multiconductor cable connecting a central office to some remote location comprising, pulse generating means at said central office, a first pulse distributing means at said central office responsive to said pulse generating means, a second pulse distributing means at said remote location responsive to said pulse generating means, visual display means to indicate the pulse advance of said second pulse distributing means, means to selectively activate said pulse generating means, ultrasonic signal source means at said central office responsive to said pulse generating means, signal commutation means to sequentially apply the output of said ultrasonic source to individual ones of said conductors in response to the output of said first pulse distributing means, probing means at said remote location to detect signals on individual ones of said conductors, means to utilize a signal detected by said probe to de-energize said selectively activated means, and means to re-energize said selectively activated means.

6. The apparatus in claim 5 wherein said re-energizing means includes switching means at said remote location to apply pulses to re-enable said selectively activated means.

7. The apparatus in claim 5 wherein said means to utilize detected signals includes means to convert said ultrasonic signal to a unidirectional signal, and means responsive to said unidirectional signal to produce a pulse to de-energize said selectively activated means.

8. Apparatus to identify individual conductors in a multiconductor cable connecting a central office to some remote location comprising, a first counting means at said central office, a second counting means at said remote location, display means to visually indicate the count of said second counting means, pulse generating means, means to apply the output of said pulse generating means to advance said first and second counting means, an ultrasonic signal source at said central office, commutation means at said central office to sequentially apply the output of said ultrasonic source to the individual conductors of said cable in response to the count of said first counting means, probing means at said remote location to detect ultrasonic signals on individual ones of said conductors, conversion means to convert said detected ultrasonic signal into a unidirectional energizing signal, and means responsive to said unidirectional energizing signal to disable said pulse generating means.

9. A conductor pair identification system for a cable including a plurality of conductor pairs and having first and second terminations, said system comprising counting means at said first and second terminations, means for starting said counting means in synchronism, means responsive to said counting means at said first termination for sequentially applying signals to the conductor pairs at said first termination, means at said second termination for detecting signals on randomly selected ones of said conductor pairs, means responsive to detected signals for halting said counting means, and means for reading the count from said counting means at said second termination.

No references cited.

KATHLEEN H. CLAFFY, *Primary Examiner*.

S. J. BOR, F. N. CARTEN, *Assistant Examiners*.